United States Patent
Marche et al.

(10) Patent No.: US 8,196,859 B2
(45) Date of Patent: Jun. 12, 2012

(54) SYSTEM FOR ATTACHING AN ENGINE TO THE STRUCTURE OF AN AIRCRAFT, SUCH AS A SAIL WING AIRCRAFT

(75) Inventors: Herve Marche, Toulouse (FR); Fabien Raison, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 417 days.

(21) Appl. No.: 12/509,818

(22) Filed: Jul. 27, 2009

(65) Prior Publication Data

US 2010/0043450 A1    Feb. 25, 2010

(30) Foreign Application Priority Data

Aug. 4, 2008    (FR) ...................... 08 55388

(51) Int. Cl.
*B64D 27/16*    (2006.01)
*B64D 27/18*    (2006.01)
*B64D 27/20*    (2006.01)

(52) U.S. Cl. ........................... 244/54; 244/55
(58) Field of Classification Search .............. 244/54, 244/55; 60/796, 797; 248/554–557
See application file for complete search history.

(56) References Cited

U.S. PATENT DOCUMENTS

| 5,921,500 A | 7/1999 | Ellis et al. |
| 2004/0195454 A1 | 10/2004 | Page et al. |
| 2005/0116093 A1* | 6/2005 | Machado et al. ............... 244/54 |

FOREIGN PATENT DOCUMENTS

| EP | 1 538 080 A1 | 6/2005 |
| FR | 2 909 358 | 6/2008 |

* cited by examiner

*Primary Examiner* — Joshua J Michener
*Assistant Examiner* — Nicholas McFall
(74) *Attorney, Agent, or Firm* — Oblon, Spivak, McClelland, Maier & Neustadt, L.L.P.

(57) ABSTRACT

A system for attaching an engine to the structure of an aircraft, such as a sail wing aircraft is disclosed. The system includes an upper beam which is firmly fixed at its front end to a first frame mounted on the aircraft structure, and firmly fixed at its median part to a second frame located to the rear of the first frame. The engine is hooked beneath the upper beam. The system is orientated in relation to a longitudinal axis X, a transverse axis Y and a vertical axis Z. Two front engine attachment points are arranged symmetrically on either side of the vertical median plane of the engine. The front attachment points include a shaft which is inclined relative to the Y-direction and to the Z-direction so that they bear the forces along the longitudinal direction and forces which are inclined relative to the Z-direction and Y-direction.

12 Claims, 4 Drawing Sheets

SYSTEM FOR ATTACHING AN ENGINE TO THE STRUCTURE OF AN AIRCRAFT, SUCH AS A SAIL WING AIRCRAFT

BACKGROUND OF THE INVENTION

1. Field of the Invention

The invention relates to a system for attaching an engine onto the structure of an aircraft such as a sail wing aircraft, where the system includes an upper beam which is firmly fixed at its front end to a first frame fitted onto the structure of the aircraft and which is in addition firmly fixed at its median part to a second frame located to the rear of the first frame, where the engine is positioned beneath the upper beam and where the system is orientated in relation to a longitudinal axis X, a transverse axis Y and a vertical axis Z, with two front points for attachment of the engine being arranged symmetrically on either side of a vertical median plane of the engine and two rear engine attachment points being located on the engine fan housing.

2. Description of the Related Art

Document FR 2 909 358 describes a sail wing aircraft which is in accordance with existing technology.

In existing engine attachment systems the engine attachment points are arranged parallel to the transverse axis Y. Consequently the attachment point bears forces along the X direction (longitudinal forces) and along the Z direction (vertical forces) but not forces along the Y direction. This is a drawback, since in this instance the rear attachment point has to withstand all the transverse forces. The subject of present invention is a system for attaching an engine to a structure of an aircraft such as a sail wing aircraft and which remedies this drawback.

BRIEF SUMMARY OF THE INVENTION

These aims are achieved, according to the invention, by the fact that the attachment points include a shaft which is inclined in relation to the Y direction and to the Z direction in order to bear the forces along the longitudinal direction and forces which are inclined relative to the Z direction and to the Y direction.

Thanks to these characteristics, the transverse forces are not borne by the rear attachment point alone but in part by the symmetrical front attachment points, because of the inclination of the shafts.

The angle of inclination of the inclined shaft is preferentially 45 degrees relative to the Y direction and also 45 degrees relative to the Z direction.

Generally, the attachment system according to the invention includes at least one rear engine attachment point which bears the forces along the Y direction and along the Z direction. This system which is removable and which is capable of withstanding the thermal expansion of the engine is made up of two radial rods at 45° which are symmetrical in relation to a vertical plane passing through the axis of the engine.

In one specific construction option, the front attachment system includes a left-hand fixing swivel joint and a right-hand fixing swivel joint each mounted externally on a flange which is firmly fixed to the engine housing, where each swivel joint is internally fitted on the shaft which is inclined relative to the Y direction and to the Z direction, where this shaft is fixed on the first frame.

BRIEF DESCRIPTION OF THE DRAWINGS

Other characteristics and advantages of the invention will also emerge from the following description of an example of a construction option given for illustrative purposes and with reference to the appended figures. In these figures.

DETAILED DESCRIPTION OF THE INVENTION

Figure 1:
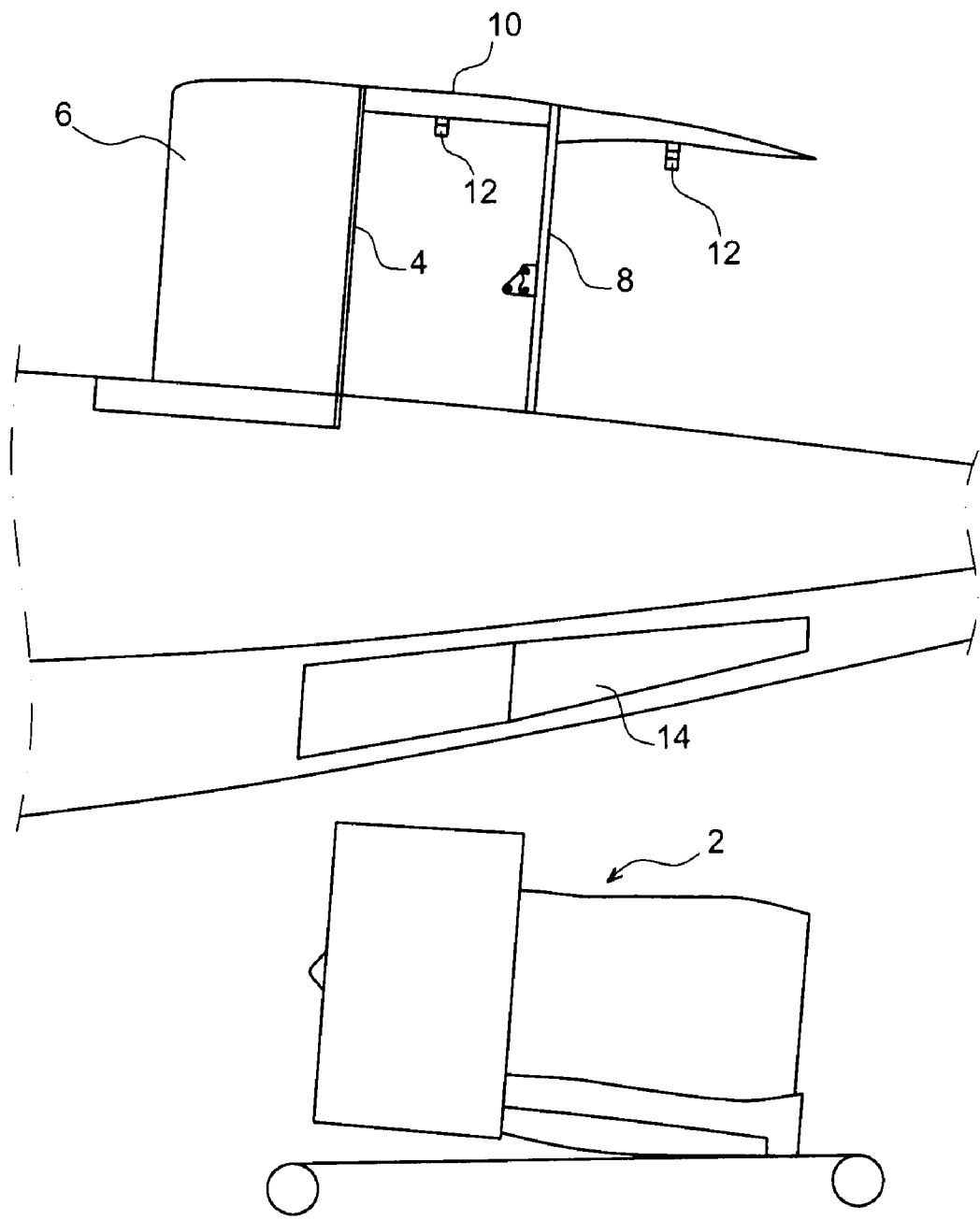
FIG. 1 is an overall view showing the engine ready to be hoisted.

Represented in FIG. 1 is the engine 2, ready to be hoisted. To this end the structure of the aircraft includes a first frame 4 which is fitted to the rear of an air inlet of the engine 6 and a second frame 8 fitted to the rear of the first frame 4. An upper beam 10 rests on the first frame 4 and the second frame 8. The upper beam 10 includes attachment points which are use to hook on a fixture 12, also known as a "bootstrap", used in hoisting the engine. These fixtures are removable and are removed once the engine has been put in position. The upper beam also includes brackets for hinging of the nacelle covers.

Figure 2:
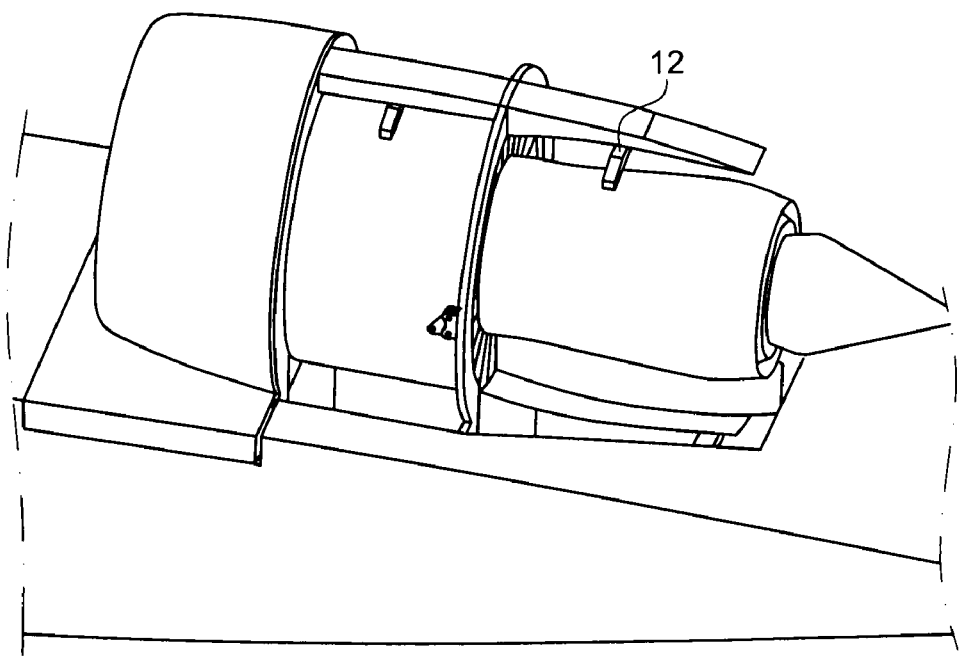
FIG. 2 is a perspective view showing the engine in the final position in the structure of the sail wing aircraft.

A cut-out 14 is made in the structure of the sail wing aircraft and this cut-out allows the engine 2 to pass through. Represented in FIG. 2 is the engine 2 in the hoisted position. The engine is fixed onto the structure of the aircraft as will be explained in more detail below.

Figure 3:
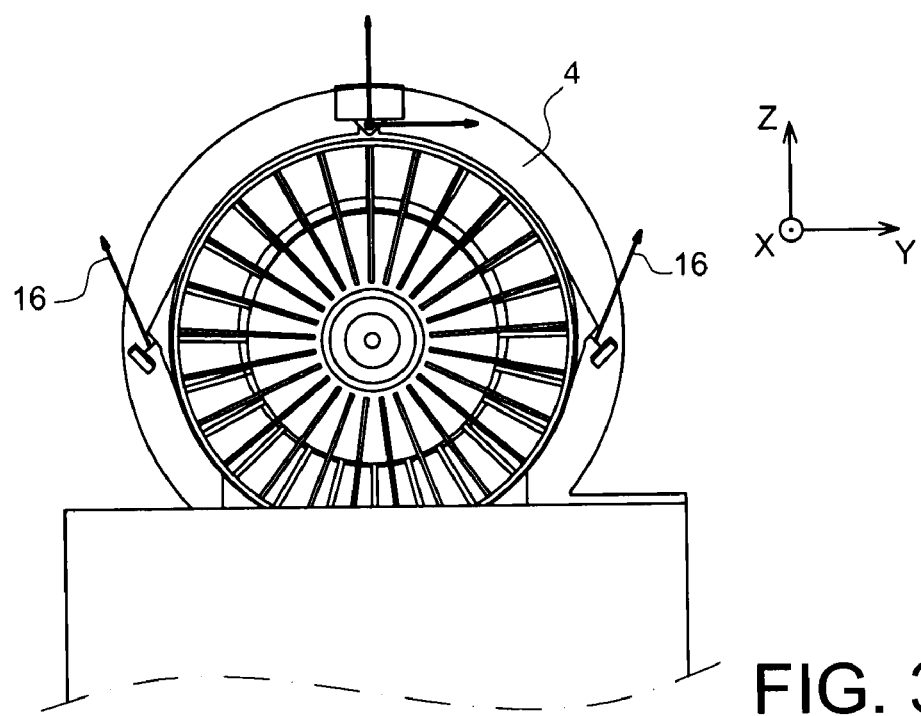
FIG. 3 is a view facing the engine.

Represented in FIG. 3 is a front view of the engine. The inclination of the forces 16 applied relative to the transverse axis Y and relative to the vertical axis Z should be noted in this figure. This is due to the fact that the front engine attachment point on the first frame itself includes a shaft which is inclined in relation to the Y direction and the Z direction, as will be explained in more detail with reference to FIGS. 5 and 6.

Figure 4:
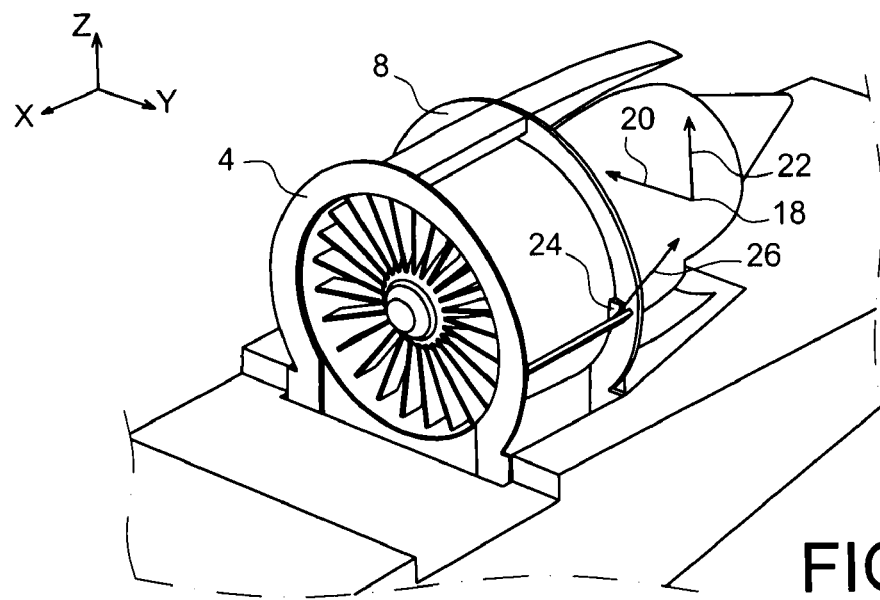
FIG. 4 is a perspective view of the engine.

Represented in FIG. 4 is a perspective view of the engine in the position in which is it hoisted onto the structure of the aircraft. A rear engine attachment point 18 bears the forces along the Y direction 20 and along the Z direction 22. In addition, an attachment point 24 mounted with free play on the second frame 8 bears the force of the engine in the event of a failure of any of the principal attachment points.

Figure 5:
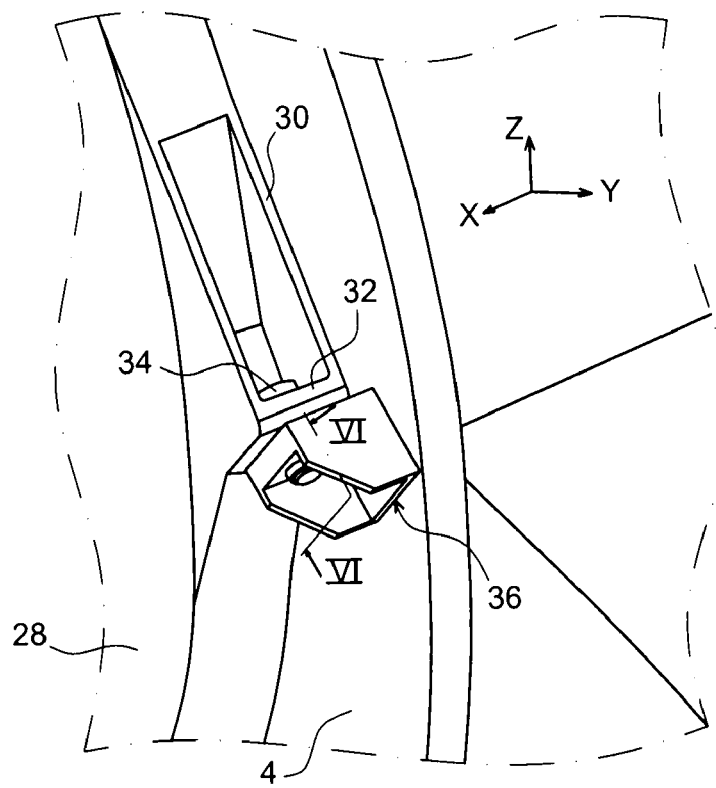
FIG. 5 is an expanded scale perspective view of the point of attachment between the frame and the engine housing.

FIG. 5 shows a perspective detail view of the front point of attachment for the engine housing 28 on the frame 4. To this end the engine housing 28 includes a flange 30 which demarcates a wall 32, a transverse shaft 34 perpendicular to the wall 32, as well as a fastening 36 which is firmly fixed to the first frame 4.

Figure 6:
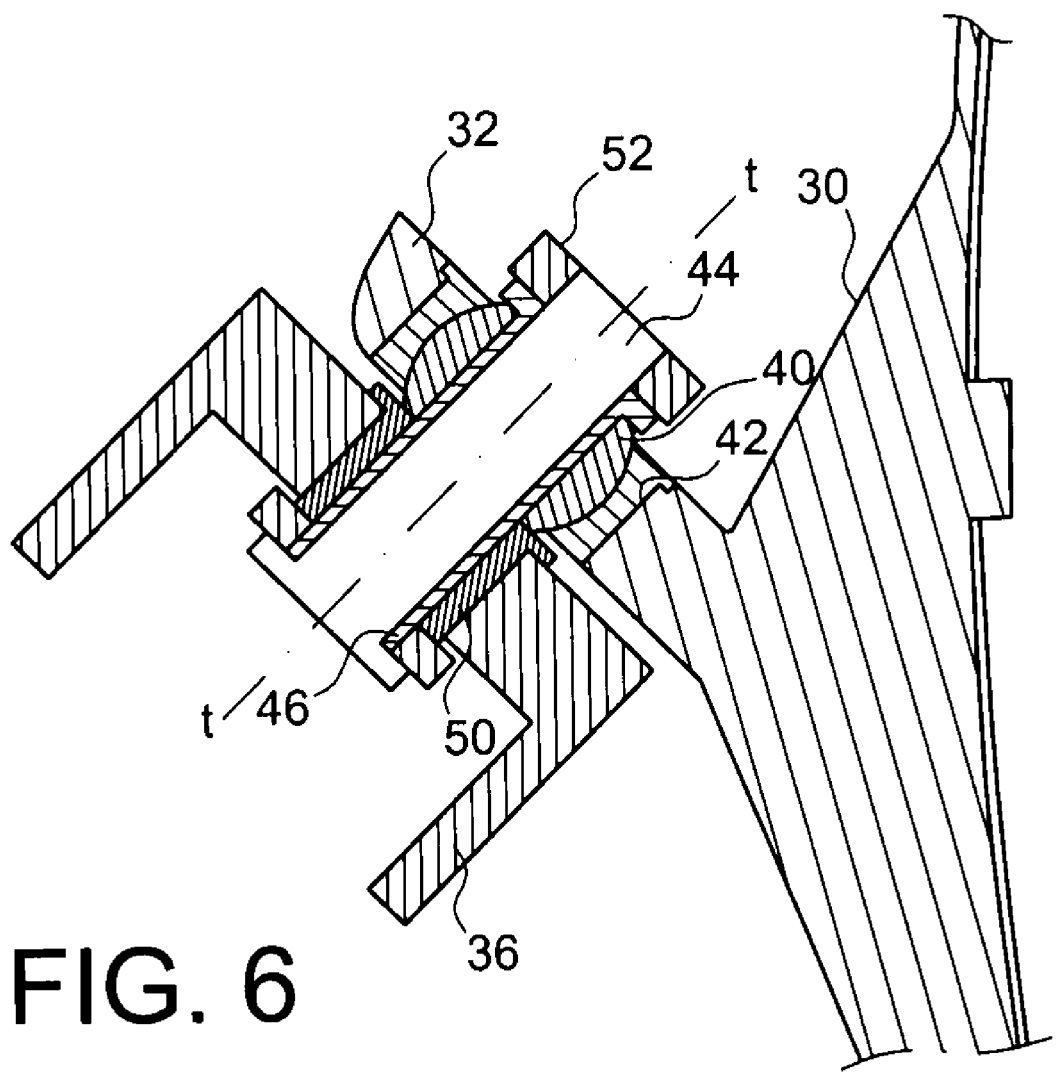
FIG. 6 shows a section view taken through plane VI-VI of FIG. 5.

As can be seen more specifically in FIG. 6, which shows a section along the plane VI-VI of FIG. 5, a swivel joint 40 is fitted in a tapping 42 of the wall 32. A shaft passes through the swivel joint. This shaft is made up of two parts, namely a solid shaft 44 and a tubular shaft 46 housed one inside the other. The shaft 46 passes through a ring 50 mounted on the fastening 36. Both shafts 44 and 46 are retained by a ring 52. As can be seen more specifically in FIG. 5 the shaft tt of the swivel joint is inclined relative to the Y direction and the Z direction so as to bear the forces which are inclined in relation to the Z direction and the Y direction.

The invention claimed is:

1. A system for attaching an engine onto a structure of an aircraft comprising:
    an upper beam having a front end;
    a first frame disposed above a wing surface of the aircraft, the first frame having a bottom portion fitted to the structure of the aircraft, the front end of the upper beam firmly fixed to a top portion of the first frame; and a second frame disposed aft of the first frame, the second frame firmly fixed to a median part of the upper beam, wherein:

the top portion of the first frame is opposite the bottom portion of the first frame, the engine is positioned beneath the upper beam, the system is orientated in relation to a longitudinal axis X, a transverse axis Y, and a vertical axis Z, two front engine attachment points are arranged symmetrically on either side of the vertical median plane of the engine, and said attachment points include a shaft which is inclined relative to the Y direction and to the Z direction so as to bear the forces along the longitudinal direction and forces inclined relative to the Z direction and the Y direction.

2. The attachment system according to claim 1, wherein the angle of inclination of an axis of the shaft is about 45° relative to the Y direction and about 45° relative to the Z direction.

3. The attachment system according to one of claims 1 or 2, further comprising:

at least one rear engine attachment point which bears the forces along the Y direction and along the Z direction.

4. The attachment system according to one of claims 1 or 2, wherein a rear fastening is made up of two radial rods at about 45°, which are symmetrical in relation to a vertical plane passing through the longitudinal axis of the engine.

5. The attachment system according to one of claims 1 or 2, further comprising:

a left-hand fixing swivel joint and a right-hand fixing swivel joint, each mounted externally on a flange which is firmly fixed to the engine housing, where each swivel joint is internally fitted on the shaft which is inclined relative to the Y direction and to the Z direction, where the shaft is firmly fixed on the first frame.

6. The attachment system according to one of claims 1 or 2, further comprising:

an attachment point fitted with free play and which is designed to bear the engine forces in the event of failure of any of the principal engine attachment points.

7. The attachment system according to one of claims 1 or 2, wherein the aircraft is a sail wing aircraft.

8. The attachment system according to one of claims 1 or 2, wherein a longitudinal axis of the engine is disposed between the upper beam and a wing surface of the aircraft.

9. A system for attaching an engine onto a structure of an aircraft, comprising:

an upper beam having a front end;

a first frame disposed above a wing surface of the aircraft, the first frame having a bottom portion fitted to the structure of the aircraft, the front end of the upper beam firmly fixed to a top portion of the first frame, wherein the top portion of the first frame is opposite the bottom portion of the first frame;

a second frame disposed aft of the first frame, the second frame firmly fixed to a median part of the upper beam;

at least one fastening firmly fixed to the first frame, the at least one fastening including a first aperture therethrough;

at least one flange firmly fixed to an engine housing, the at least one flange including a second aperture therethrough; and at least one shaft disposed through the first aperture and the second aperture, wherein the shaft is inclined relative to a transverse axis of the engine and a vertical axis of the engine so as to bear forces in a longitudinal direction of the engine and bear forces inclined relative to the transverse axis of the engine and the vertical axis of the engine.

10. The attachment system of claim 9, further comprising:

at least one swivel joint including a third aperture therethrough, the at least one shaft disposed through the third aperture.

11. The attachment system of claim 9, wherein the at least one shaft comprises a solid shaft and a tubular shaft, the solid shaft disposed through an inner diameter of the tubular shaft.

12. The attachment system of claim 9, further comprising:

at least one ring disposed on the at least one shaft, thereby retaining the shaft in the first aperture and the second aperture, and thereby fastening the at least one fastening to the at least one flange.

* * * * *